US007175320B1

(12) United States Patent
Burgess

(10) Patent No.: US 7,175,320 B1
(45) Date of Patent: Feb. 13, 2007

(54) ADJUSTABLE ELEVATED LIGHT FOR TRANSPORTATION VEHICLES

(76) Inventor: Lynn Emerson Burgess, P.O. Box 110, Issaquah, WA (US) 98027

( * ) Notice: Subject to any disclaimer, the term of this patent is extended or adjusted under 35 U.S.C. 154(b) by 208 days.

(21) Appl. No.: 10/247,854

(22) Filed: Sep. 20, 2002

(51) Int. Cl.
B60Q 1/26 (2006.01)

(52) U.S. Cl. .................. 362/478; 362/479; 362/543; 362/549; 340/433

(58) Field of Classification Search ........... 362/478, 362/479, 543, 549, 494; 340/433
See application file for complete search history.

(56) References Cited

U.S. PATENT DOCUMENTS 1,540,904 A * 6/1925 Schlaich .................. 362/494
5,467,071 A * 11/1995 Koenig .................... 340/433
6,572,250 B1 * 6/2003 Assinder et al. ........... 362/494
6,616,312 B2 * 9/2003 Carter .................... 362/488

* cited by examiner

Primary Examiner—John Anthony Ward
Assistant Examiner—Anabel Ton

(57) ABSTRACT

An adjustable, elevated and externally mounted lighting device (21) for vehicles such as school busses (22) and other types of vehicles, that provides a pool of light (23) to passenger loading and unloading areas for better visibility of passengers, vehicle drivers, and other vehicle operators in the vicinity during hours of darkness. The light's adjustability, combined with a diffused lens (29), provides a broad and bright pool of light (23) without obstructing passenger visibility or driver use of side mirrors (30). The light (21) is connected to the vehicle's on-board electrical power system and is activated automatically without distracting driver attentiveness, but with provisions for manual over-ride activation if needed in special circumstances such as emergencies or wheelchair loading/unloading.

1 Claim, 8 Drawing Sheets

ADJUSTABLE ELEVATED LIGHT FOR TRANSPORTATION VEHICLES

CROSS-REFERENCE TO RELATED APPLICATIONS

| U.S. Patent Documents | | | |
| --- | --- | --- | --- |
| 961887 | June, 1910 | McAloney | 362/76 |
| 1072096 | September, 1913 | Dean | 362/76 |
| 2065876 | December, 1936 | Siegfried | 362/80 |
| 4964022 | October, 1990 | Lane | 362/481 |
| 5467071 | November, 1995 | Koenig | 340/433 |

BACKGROUND—FIELD OF INVENTION

This invention relates to providing adjustable, elevated and externally mounted diffused illumination of the loading and unloading areas adjacent to a vehicle, such as needed for school/public transportation busses & delivery trucks. This is accomplished by creating an adjustable lighting system utilizing adjustable mounting brackets and adjustable interior and exterior mounting equipment; together with electric light source & diffused lighting lens.

BACKGROUND—DESCRIPTION OF PRIOR ART

Transportation of people and goods occurs not only during daylight but also during the hours of darkness and in inclement weather. In many areas the absence of sufficient ambient light (e.g. street lamps), makes loading and unloading the vehicle a particularly hazardous procedure, especially for small school children. Exiting a vehicle without proper light can entail stepping out into the dark where snow, ice, rocks, tree limbs, and other hazards cannot be seen.

Most rural locations have no ambient light sources and are dangerous during dark hours pick-ups and drop-offs, which is very common in the Northern latitudes. School districts at all latitudes have at least some nighttime extra-curricular activities as well. These include sports and field trips that can benefit from improved area lighting.

There are several ways in which original equipment manufacturers and after-market suppliers have addressed the concept of both interior and exterior vehicle lighting. None, however, provide diffused elevated light to passenger waiting areas prior to stopping, during the loading/unloading, and after the doors have closed.

U.S. Pat. No. 5,467,071 Koenig does not provide overhead lighting for loading and unloading passengers to see by and for driver's visibility of this activity without creating mirror glare.

U.S. Pat. No. 4,964,022 Lane also does not provide adjustable and diffused lighting to enable safe visibility for passengers while avoiding blinding the driver with glare in the mirrors.

Likewise, U.S. Pat. No. 2,065,876 Siegfreid does not provide for adjustable and diffused lighting that enables safe visibility for passengers while not blinding driver views with glare in the mirrors.

U.S. Pat. No. 1,072,096 Dean also does not provide diffused and adjustable lighting that enables safe visibility for passengers while not blinding driver views with glare in the mirrors.

Existing interior lighting on or above the stairway(s), around the driver, and in other portions of the vehicle exist for the purpose of providing better on-board visibility inside the vehicle. None of these interior designs or applications provides adequate light to the passenger waiting areas.

Similarly, exterior lighting on vehicles including but not limited to headlights, taillights, running lights, and warning lights are not designed to, nor do they provide, sufficient light by which both passengers and drivers can safely see the loading and unloading environment.

SUMMARY

In accordance with the present invention, an adjustable, elevated, externally mounted lighting device that provides illumination by means of a control switch within a vehicle to substantially enhance the level of light in the loading and unloading areas.

OBJECTS AND ADVANTAGES

Accordingly, increased light levels in the passenger waiting areas afford the following advantages:
  (a) enhances safety of passengers while loading and unloading by reducing the risk of a trip or fall
  (b) improves driver visibility of both hazards and passengers when pulling to a stop, without creating glare in the mirrors.
  (c) improves driver visibility of passenger waiting areas ensuring appropriate clearance when pulling away
  (d) provides drivers of other vehicles approaching the stopped vehicle with improved visibility of the environment immediately surrounding the stopped vehicle
  (e) enhances safety of driver while loading and unloading goods by reducing the risk of a trip or fall Further objects and advantages of my invention will become apparent from a consideration of the drawings and ensuing description.

DRAWING FIGURES

A preferred embodiment of this invention has been chosen for purposes of illustration, wherein.

REFERENCE NUMERALS IN DRAWINGS

Figure 1:
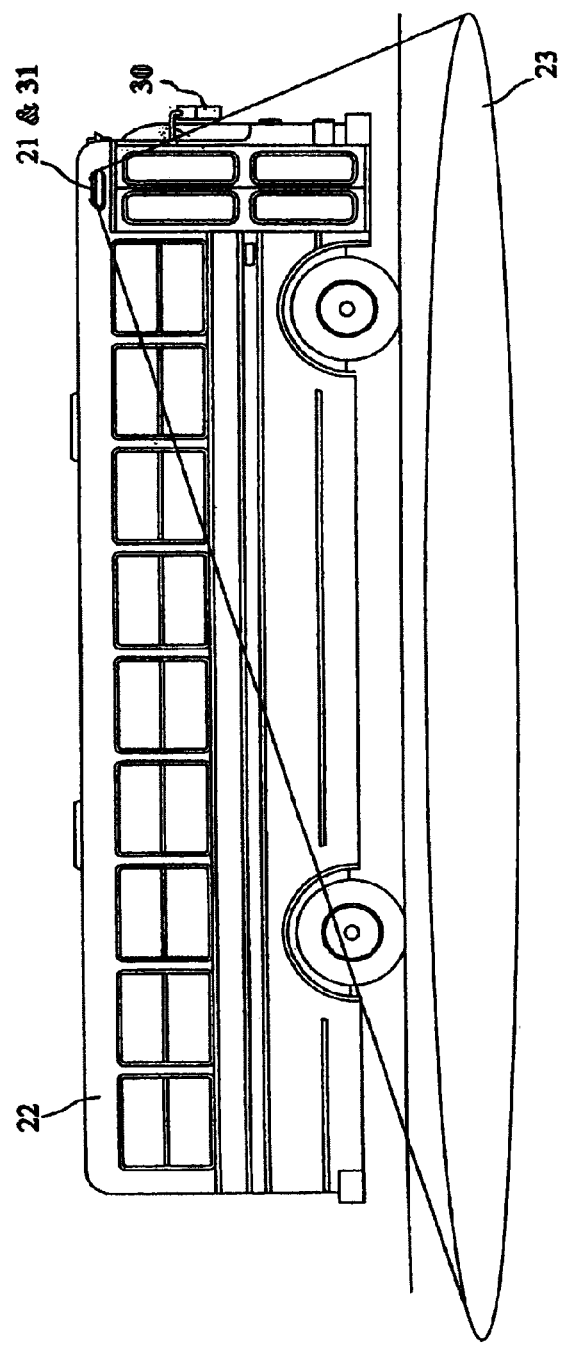
FIG. 1 is a side elevation view of a preferred embodiment of this invention mounted above the forward passenger entry door of a school bus showing the diffused lighting pool adjusted in such a way as to avoid creating glare in the driver's side mirrors.

(21) A preferred embodiment of the light, which is the subject of the present invention
(22) School bus
(23) Pool of light
(24) Light source shroud
(25) Adjustable light source
(26) Adjustable light source attachment bracket
(27) Adjustable mounting bracket with adjustable equipment
(28) Light/bus gasket
(29) Diffused lens
(30) Driver's side view mirrors
(31) Preferred embodiment of light location installed above the main entry door
(32) Additional embodiment of light location (Driver's Window)
(33) Additional embodiment of light location (Handicap Entrance)
(34) Additional embodiment of light location (Cargo Area)
(35) Additional embodiment of light location (Emergency Exit)

DESCRIPTION OF THE PREFERRED EMBODIMENT

The preferred embodiment illustrated is not intended to be exhaustive or limit the invention to the precise form disclosed. It is chosen and described to best explain the principles of the invention, its application and practical use. It will be understood that the present invention may be used with other types of vehicles such as other types of busses, delivery trucks and recreational vehicles.

Figure 2:
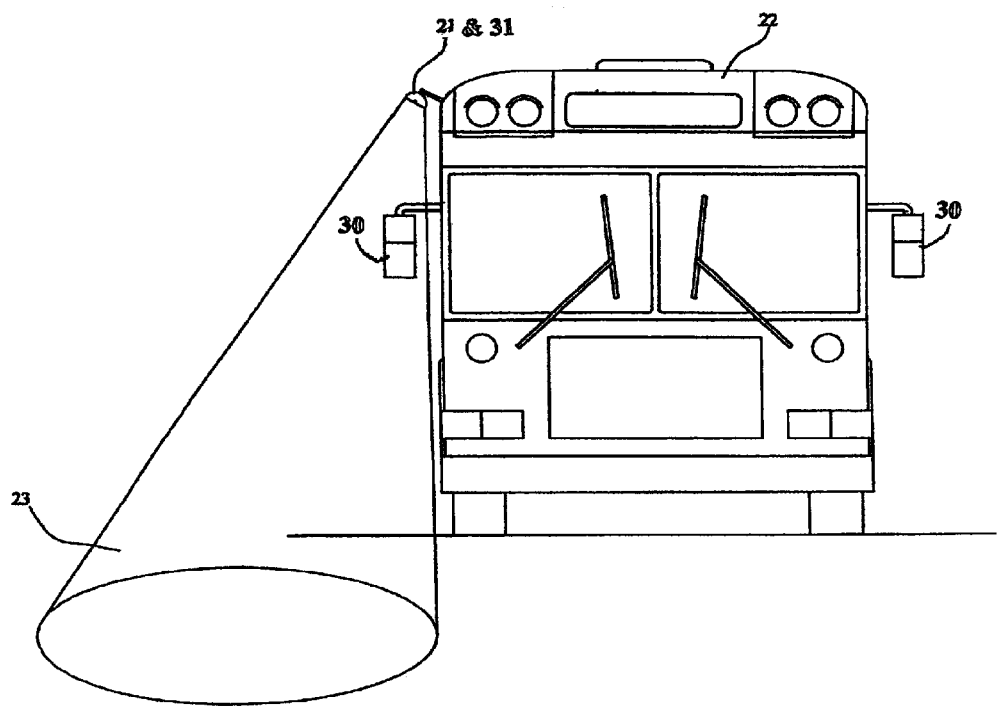
FIG. 2 is a front elevation view of the school bus illustrated in FIG. 1 showing a light mounted above the entry door adjusted to provide diffused light directly adjacent and outward from the subject vehicle.
Figure 3:
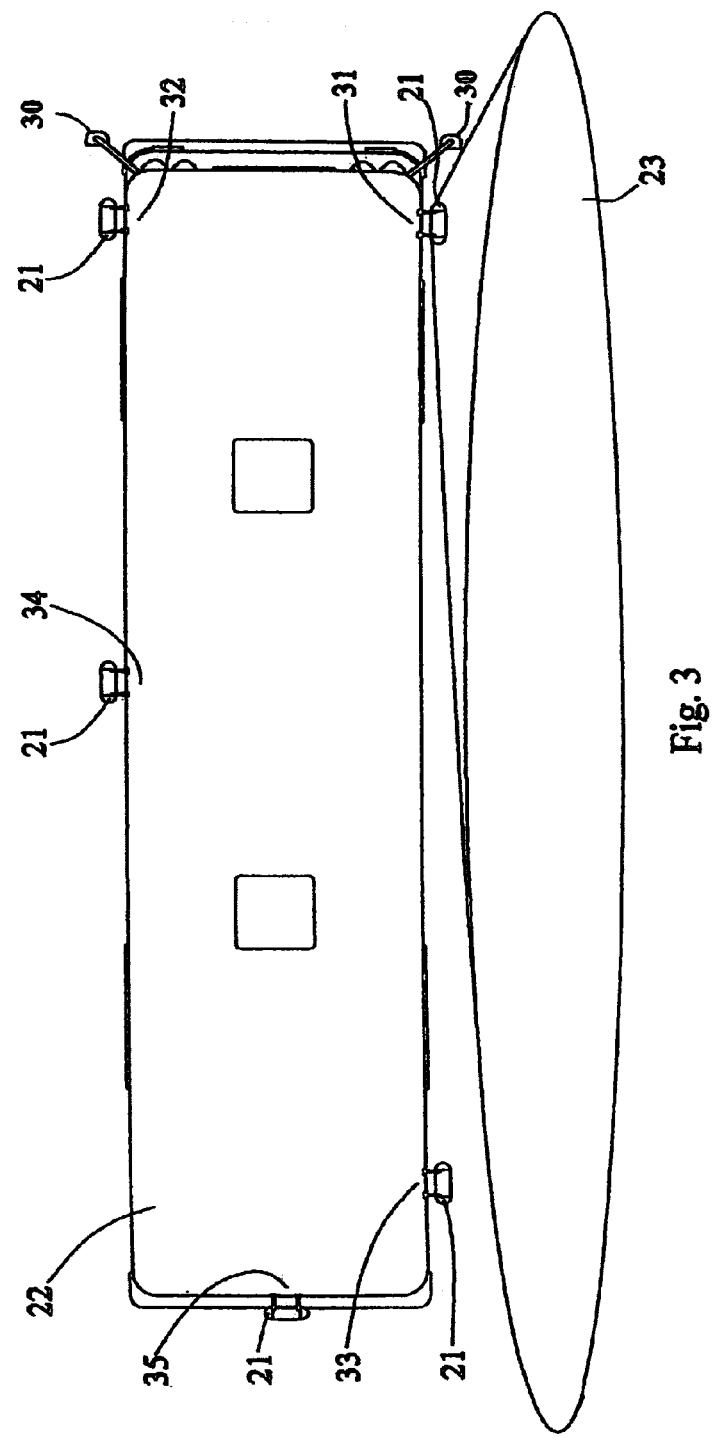
FIG. 3 is an overhead plan view of the school bus illustrated in FIG. 1, showing a preferred embodiment over the entry door adjusted to avoid creating glare in the driver's right side mirrors and also showing some of the additional mounting locations that could be employed.

Bus (22), which may be of any standard form or construction adopted to transport individuals, is depicted in the illustrated embodiment as a school bus and shown in FIGS. 1, 2, & 3. In normal use, passengers enter and exit via a primary entry door generally located forward and on the right side of a typical school bus vehicle. Some busses also have a handicap entry door as well, which is typically located along the right side of the bus about halfway between the front and back of the vehicle. There are also emergency exit doors in various locations, as well as driver's side view mirrors (30). As thus far described bus (22) is of a standard, well known construction as manufactured by numerous companies and regulated by various Federal and State agencies.

Figure 4:
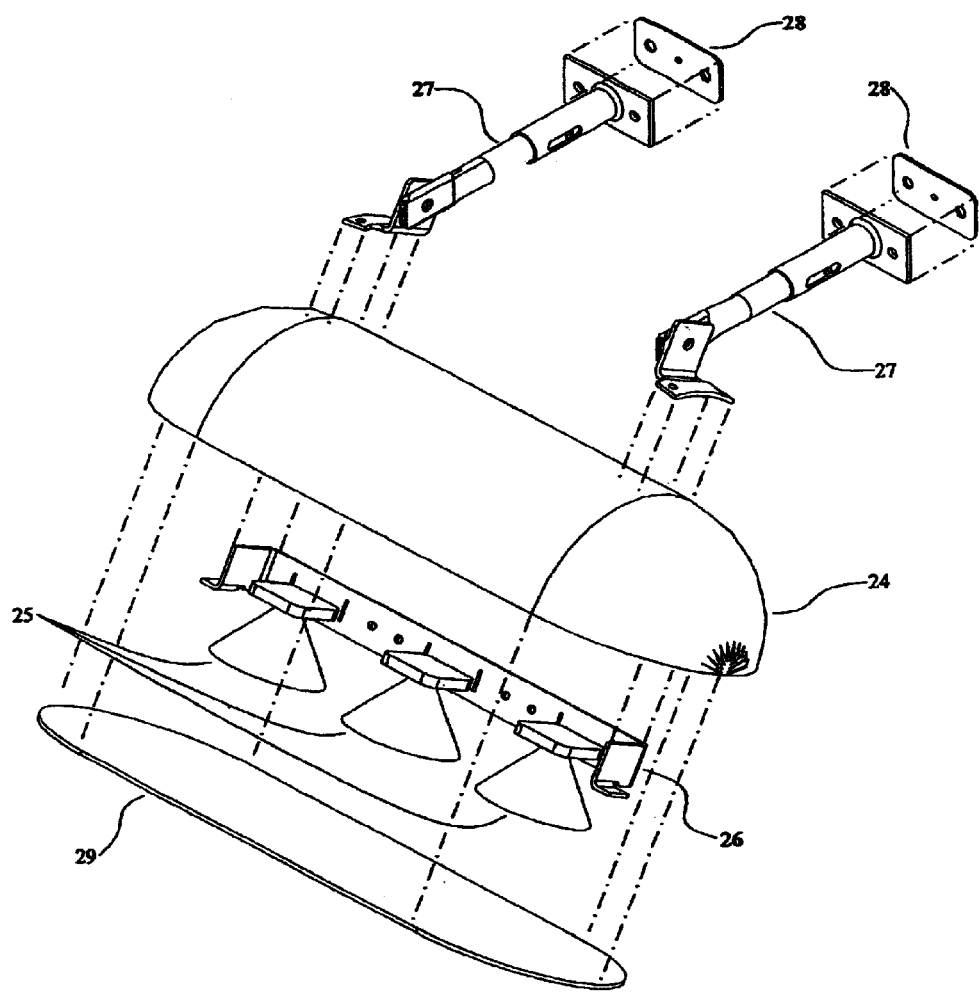
FIG. 4 is a partially exploded view of a preferred embodiment of the lighting device showing the sturdy housing, electrically powered light sources, adjustable mounting hardware and diffused lens.
Figure 5:
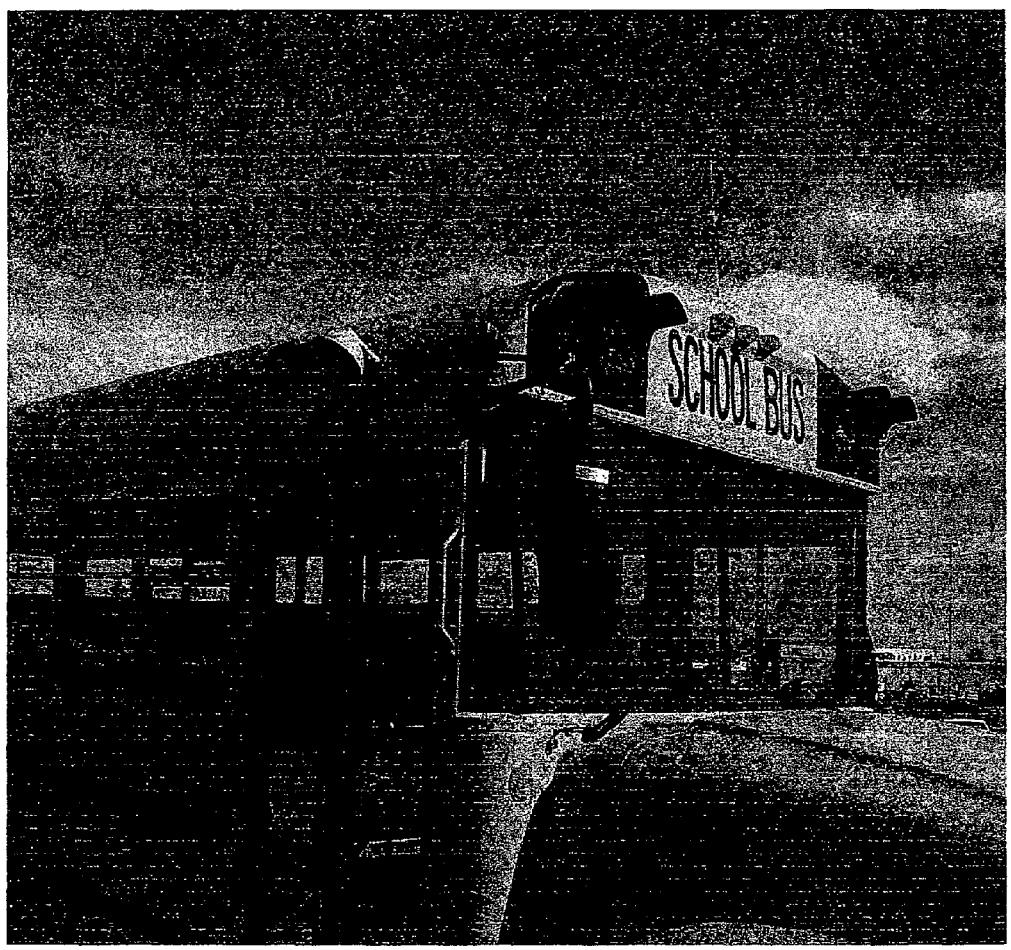
FIG. 5 is a side view photograph of a preferred embodiment of the lighting device mounted above the entry door of a standard school bus, similar to FIG. 1.
Figure 6:
FIG. 6 is a front view photograph showing a school bus with an adjustable elevated light mounted above the entry door, similar to FIG. 2.
Figure 7:
FIG. 7 is another side view photograph of a preferred embodiment of the light mounted above the entry door as seen from a passenger's perspective below and in front of the entry door.
Figure 8:
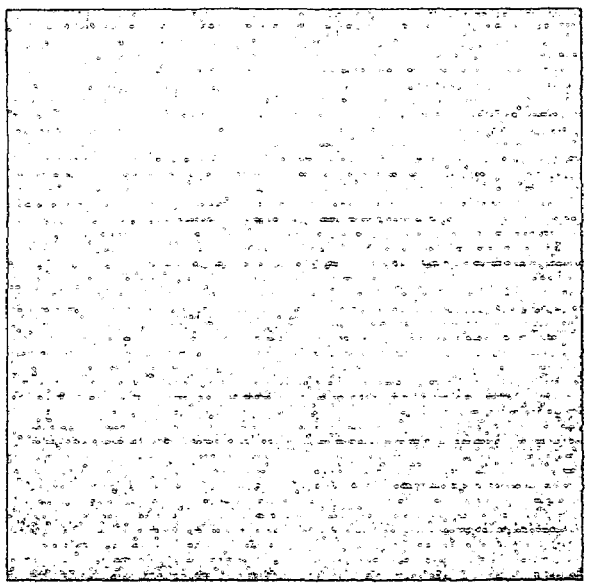
FIG. 8 is a photograph showing children standing at a typical bus stop in near-darkness prior to activation of the light mounted in a preferred embodiment.
Figure 9:
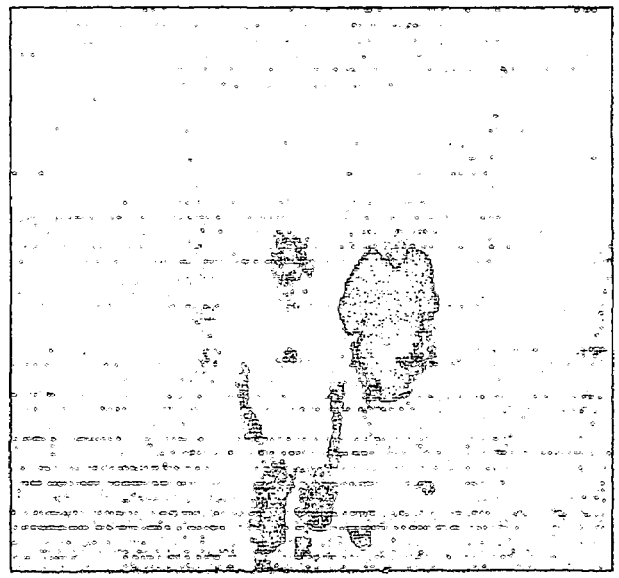
FIG. 9 is a photograph showing the same children depicted in FIG. 8 after activation of the light mounted in a preferred embodiment.

A preferred embodiment of the light & location (21 & 31) is mounted above the entry door of the bus (22) and activated in conjunction with any of several alternative on-board electrical systems, such as the warning lights, hazard lights and/or entry door. The light (21) is more particularly described in FIG. 4, the preferred embodiment of which includes a sturdy light source shroud (24), an adjustable light source (25) consisting of 3 halogen light bulbs & reflectors which allow variable angles of light projection, and an adjustable light source attachment bracket (26). The preferred embodiment also includes 2 adjustable mounting brackets with adjustable equipment (27) and 2 light/bus gaskets (28) that are used to mount and adjust the light at various angles. Such light includes a diffused lens (29), which prevents visual impairment due to glare for both passengers and driver. The combination of all the items shown in FIG. 4 provides the ability to adjust and optimize the diffused pool of light (23) to encompass a wide area where passengers are waiting and/or disembarking.

DESCRIPTION OF ADDITIONAL EMBODIMENTS

The additional embodiments are infinitely varied with respect to location of light around the perimeter of the vehicle and the specialized needs of owners and operators. Such additional embodiments or light locations could include driver's window (32), handicap entrance (33), cargo areas (34) and emergency exits (35).

DESCRIPTION—ALTERNATIVE EMBODIMENTS

There are nearly unlimited numbers of other potential vehicle applications that are also possible. In these other situations the particular design of the light source shroud (24) and other components would be tailored for the market requirements. Alternative products that could be designed to meet unique requirements include, but are not limited to:

Metro busses
Charter busses
Delivery vans and vehicles,
Recreational vehicles

ADVANTAGES

From the descriptions above it should be clear that there are a number of advantages to an adjustable elevated light on transportation vehicles. These include, but are not limited to:

(a) Provides safer loading and unloading of people in dark conditions, particularly when snow, ice, tree limbs and uneven surfaces are present;
(b) Provides ability during dark hours to see the passenger waiting environment while approaching, stopping and leaving a stop;
(c) Provides driver awareness and ability to see the passenger waiting environment clearly at all times to avoid hitting people and hazards;
(d) Provides improved visibility for other drivers on the same road or street, of passenger waiting area loading conditions/activities and therefore a less likelihood of accidentally hitting someone;
(e) Provides reduced wear and tear on tires as drivers can better see curbs and other obstacles to avoid scraping up against them;
(f) Provides a large pool of light without creating glare that would otherwise obstruct driver and/or passenger vision;

(g) Provides drivers of passenger transportation vehicles the ability to better see all of the people waiting to board the vehicle, not just their feet;
(h) Is designed and manufactured to meet the unique requirements of regulators of various vehicle types;
(i) Provides the vehicle driver with safer lighting for entering and exiting the vehicle;

OPERATION

The initial application of the Adjustable Elevated Light for Transportation Vehicles, operates as follows:

1) The driver of the vehicle (22), as shown in FIGS. 1, 2, & 3, switches the system on from within driver area inside the vehicle.
2) Operation of the adjustable elevated light (21), as shown in FIGS. 1, 2, 3, & 4, is automatic either with the activation of the 4/8 way flashers, the entry door, or when the driver uses any other on-board system controlled from within the driver area of the vehicle. In any of these cases the adjustable elevated light (21), comes on & off automatically, but can be manually switched on or off using an optional over-ride switch.
3) As the driver approaches a bus stop they use the normal systems they already use on approach to a stop (such as the flashers, external warning signs, or after coming to a stop and opening the entry door), to have the light (21), as shown in FIGS. 1, 2, & 3, automatically provide a pool of light (23), as shown in FIGS. 1, 2, & 3, to the passenger waiting areas.
4) Upon departure from a stop, the light (21), as shown in FIGS. 1, 2, & 3, stays on for a few extra seconds (0–15 seconds, depending on customer settings).

CONCLUSION, RAMIFICATIONS, AND SCOPE

Accordingly the reader will see that the Adjustable Elevated Light for Transportation Vehicles can be used in a number of applications that all serve to provide better lighting in the passenger waiting areas, which enhances safety for all concerned.

I claim:

1. An adjustable, elevated and externally mounted lighting device comprising a means for mounting an illumination source on a public or private commercial passenger vehicle so that a majority of the loading and unloading side of said vehicle is illuminated aiding in the loading and unloading of passengers; said lighting device having multiple light sources that are filtered by filtering means, said light device is located directly above said loading and unloading side and is initialized by automated or manual control means within said vehicle; said control means and lighting device powered by vehicle on-board electrical elements within said vehicle.

* * * * *